US006586497B2

(12) United States Patent
Gay et al.

(10) Patent No.: US 6,586,497 B2
(45) Date of Patent: *Jul. 1, 2003

(54) TRANSPORT OF SOLID PARTICULATES

(75) Inventors: Frank T. Gay, Twinsburg, OH (US); Daniel Constantiner, Beachwood, OH (US); Jeffrey T. Champa, Euclid, OH (US); Kevin Hutchings, Twinsburg, OH (US); Daniel G. Millette, Aurora, OH (US)

(73) Assignee: MBT HoldingAG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/962,946

(22) Filed: Sep. 25, 2001

(65) Prior Publication Data

US 2002/0030076 A1 Mar. 14, 2002

Related U.S. Application Data

(63) Continuation of application No. 09/506,770, filed on Feb. 18, 2000, now Pat. No. 6,297,295
(60) Provisional application No. 60/122,604, filed on Mar. 3, 1999.

(51) Int. Cl.$^7$ .................. C04B 38/10; C09K 17/40; E21B 33/00; E21C 41/32
(52) U.S. Cl. ................. 523/130; 523/131; 523/132; 106/681; 166/293; 299/11
(58) Field of Search ................ 523/130, 131, 523/132; 106/681; 166/293; 299/11

(56) References Cited

U.S. PATENT DOCUMENTS

| | | | |
|---|---|---|---|
| 3,661,603 A | 5/1972 | Nicol | |
| 4,265,674 A | 5/1981 | Debus et al. | |
| 4,395,456 A | 7/1983 | Jackson et al. | |
| 4,419,135 A | 12/1983 | Hoge | |
| 4,451,183 A | 5/1984 | Lorenz | |
| 4,466,833 A | 8/1984 | Spangle | |
| 4,615,564 A | 10/1986 | Garrett | |
| 5,063,967 A | 11/1991 | Stephens | |
| 5,080,534 A | 1/1992 | Goodson et al. | |
| 5,494,514 A | 2/1996 | Goodson et al. | |
| 5,711,801 A | 1/1998 | Chatterji et al. | |
| 6,046,255 A | 4/2000 | Gray et al. | |
| 6,297,295 B1 | * 10/2001 | Gay et al. | |

FOREIGN PATENT DOCUMENTS

| | | |
|---|---|---|
| EP | 114 448 | 1/1983 |
| EP | 0 562 823 A1 | 9/1993 |
| GB | 2090823 | 12/1981 |
| GB | 2 090 823 A | 7/1982 |

OTHER PUBLICATIONS

F.W. Brackenbusch, Basics of Paste Backfill Systems, Technical Papers, Feb. 15, 1994.
Derwent Acc. No. 1988–110893/198816, Abstract: SU 1339248A, Sep. 23, 1987.
Derwent Acc. No. 2000–339605/200029, Abstract: WO 200023395 A1, Apr. 27, 2000.

* cited by examiner

Primary Examiner—Tae H. Yoon
(74) Attorney, Agent, or Firm—Renner, Kenner, Greive, Bobak, Taylor & Weber

(57) ABSTRACT

A method is provided for incorporating a foaming agent into mixtures of particulates and then forming a foam within the mixture to increase the flowability of the particulates. A method is also provided for excavating solid particulates, incorporating a foaming agent into mixtures of solid particulates, and then forming a foam within the mixture to increase the flowability of the particulates. The particulates can be transported through pipelines or boreholes. Examples of particulates include, but are not limited to, mine tailings, ores, sand, coal, soils, clays, silts, aggregates, and mixtures thereof.

17 Claims, No Drawings

TRANSPORT OF SOLID PARTICULATES

CROSS-REFERENCE TO RELATED APPLICATIONS

This application is a Continuation of U.S. Ser. No. 09/506,770 filed Feb. 18, 2000, now U.S. Pat. No. 6,297,295 which claims priority from U.S. Provisional Patent Application No. 60/122,604 filed Mar. 3, 1999.

FIELD OF THE INVENTION

The present invention is directed to transportation of solid particulates. More particularly, the present invention is directed to a single stage method of incorporating a foaming agent into mixtures of solid particulates and then forming a foam within the mixture prior to transport to increase the flowability of the solid particulates.

BACKGROUND OF THE INVENTION

Solid particulates, which include but are not limited to, mine tailings, ores, sand, coal, soils, and aggregates, have conventionally been transported through pipelines or boreholes as a slurry. Typically, a liquid, such as water, is added to the particulates to make the particulates flow. The particulates are suspended in a sufficient quantity of liquid such that the flow of the liquid moves the particulates through the pipeline.

Ideally, the particulates should remain in suspension while being transported through pipelines or boreholes to their final destination. Particulates, such as classified or unclassified mine tailings, may be characterized by features that limit the ability to transport the material as a paste. Such characteristics may include: high density or specific gravity, poor or gapped gradation, coarse particle size, highly sorted particle size gradation, or lack of fine particles. These features tend to prevent particulates from being made into a stable paste consistency without the addition of fine materials, such as sands, to enhance the particle size distribution.

As a result, these particulates must currently be transported as low-load slurries that must maintain turbulent flow conditions throughout the transport system to prevent the particulates from settling out and clogging the transport pipes. Additionally, the transport fluid may bleed out of the slurry and cause reduced fluidity of the mixture and clogging of the transport pipes.

Reduction of fluid content may produce a material that approaches the consistency of a paste, but which would also develop reduced turbulence and shear thickening properties. This makes transport by pumping or by gravity through a transport system less desirable and more problematic than by hydraulic transport.

One type of particulate transport is the transport of mine tailings as backfill in mines, or to the surface to remove the tailings from the mine. The backfill mine tailings can be transported alone, or a cement can be added to provide for a set composition. It is desired in the art to transport mine tailings as a paste consistency, rather than by hydraulic transport. However, the particle size distribution needs to be optimized to provide paste consistency transportation. The particle size distribution of a mine tailing may be made to conform to a more idealized particle size distribution by the addition of fine materials or sand. This however increases the handling and treatment costs of the mine tailings and increases costs to the mining operations. The ideal fill exhibits slurry-like properties of ease of transport in pipes (i.e., low pressure losses), but paste-like properties of staying in suspension at relatively low transport velocities with no run off.

Once the slurry of particulates arrives at the desired destination, the transport fluid drains out. The fluid must then be pumped away, which adds additional handling and disposal costs to the operation. Additionally, if a cement is included with the particulates, some cement will be present in the drain water which may then harden in the drain system, and increase the maintenance costs of the operation. In the cases where mine tailings are transported to the surface, a dam must be erected to manage and recover the water. This adds additional cost, potential liability, and is a potential safety hazard.

Foam suspends the particulates and reduces the amount of liquid required to transport the material. It is known, as in U.S. Pat. No. 5,080,534 to Goodson et al., to generate a foam from a surfactant and then mix the foam with the particulates prior to transport in the pipeline. Also, it has been known, as in U.S. Pat. No. 4,451,183 to Lorenz, to inject foam that was separately prepared, into the particulates at various points throughout the pipeline. However, these prior art methods require that the foam be separately prepared before being added to the mixture. The separate preparation requires additional equipment and time to prepare the foam, which adds additional cost to the project.

Mine backfilling is the process of filling voids in mines left by the underground excavation of ore to provide structural support for the mine or to dispose of mine tailings. Materials used to fill mine voids include waste rock, mine tailings, and sand. Often, sand is mixed in with mine tailings.

Mine tailings are the result of grinding the ore or rock fine enough to liberate minerals through a flotation process. Because of the low content of minerals in the ground rock, typically less than 10% by weight, almost all of the rock mined becomes mine tailings. Mine tailings generally have consistencies similar to those of fine clay or silt. Traditionally, large quantities of water must be added to the tailings to make them pumpable. The tailings at final placement then must be thickened to allow the tailings to set in place. There is a very significant cost to the thickening of mine tailings.

Once the mine tailings are pumped from the mill, they are either sent directly to a tailings pond, sent directly to a backfill plant, or processed with a hydro-cyclone to separate the coarse particles from the finer particles. The coarse fraction is sent to the backfill plant, and the fine fraction is sent to the tailings pond. A tailings pond is generally a large area where the tailings are left to settle and the resulting water is drained off to clarification ponds.

A method of producing mine backfill from mine tailings is to process the tailings slurry with a bank of hydro-cyclones to remove the coarser portion of the material. The coarser portion (underflow) is fed into a silo and allowed to settle with some of the water overflowing the top of the silo. The denser tailings material is removed from the silo and pumped to a mixer, where cement is added to produce hydraulic backfill.

The backfill, which is a slurry of typically 50% solids by weight, is poured down a vertical hole or pipe to be deposited in the mining voids or stopes left underground. Because it is a slurry, the backfill requires high volumes of cement to consolidate the material, and water that does exude from the backfill must be pumped out of the mine. The cement contents range from about 3% by weight to about 10% by weight. Using a relatively low percentage of cement requires a much longer time for the backfill mass to be considered "load-bearing" or competent.

Another method of backfill is paste backfill. Paste backfill uses a lower cement content, usually about half, as compared to the hydraulic backfill method described above. Also, there is no water exuded from the fill mass to pump to the surface. The consolidation time is reduced to a fraction of the time required to consolidate hydraulic backfill, allowing a faster cycle time. Another advantage of using paste backfill is that it is usually made from total (unclassified) tailings. This reduces the burden of maintaining a large surface impoundment area.

Paste backfill, however, has some drawbacks. It is more difficult to transport paste to the mine or stopes, sometimes requiring a positive displacement pump to transport the paste through the piping. The production of paste is usually accomplished by processing the mill tailing slurry by using large vat thickeners, disc filters, or a combination of both. This results in a large multimillion dollar capital investment.

What is needed in the art is a foaming agent that can be incorporated into the solids mixture, to then form the foam within the mixture as a single-stage process, to eliminate the separate stages of preparation, pregeneration, and combination of a foam into the slurry prior to transport of the solids as in a pipe.

It is therefore an object of the invention to provide a method of transporting particulates by incorporating a foaming agent in a mixture of particulates and then producing a foam in the mixture prior to transport through pipelines or boreholes as a slurry.

SUMMARY OF THE INVENTION

The present invention provides a method of transporting particulates comprising: providing particulates; adding a foaming agent to form a mixture; and mixing said mixture to form a foam within the mixture.

The present invention also provides a method of excavating and transporting solid particulates comprising: removing the solid particulates from an excavation area; mixing a foaming agent with the solid particulates to form a transportable mixture; adding water and a binder to the transportable mixture; mixing the transportable mixture, water, and binder to form a hydraulic composition; and transporting the hydraulic composition to a desired location.

DETAILED DESCRIPTION OF THE INVENTION

The present invention provides a method of transporting solid materials including providing particulates, adding a foaming agent to form a mixture, and mixing said mixture to form a foam within the mixture.

The benefit of the method of the present invention is that the steps of preparation, pregeneration, and mixing of the foam may be eliminated.

The mixing action causes the foaming agent to foam in the mixture. The mixing action can be provided by most commercially available mixing devices.

The transporting of the mixture can be accomplished by pumping or by gravitational head driven pressure. Another benefit to this method of incorporating a foaming agent into the particulate mixture is that the pressure required to pump the material is reduced. The foaming agent reduces the dilatency of the particulates in the mixture. The use of the foaming agent therefore allows the pumping of particulates that would have otherwise been unpumpable.

The water content of the mixture is less than about 50% based on the mass of the solid material. Preferably, the mixture has a water content of about 5 to 25% to form a paste consistency. The water demand of the material is dictated by the features of the particle size distribution and mineralogy that are unique to each material.

Examples of solid materials that can be transported by the above method include, but are not limited to, mine tailings, ores, sand, coal, soils, clays, silts, aggregates, and mixtures thereof.

Foaming agents that can be used with the method of the present invention include alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, silicon containing surfactants, olefin sulfonates, olefin sulfates, hydrolyzed proteins, and mixtures thereof. A preferred foaming agent is an alpha olefin sulfonate sold under the trademark PS-356 from Master Builders, Inc., Cleveland, Ohio. The foaming agent is added in an amount from about 0.001% to about 0.4% based on the mass of the solid material, preferably about 0.005% to about 0.025%.

Preferably, the foaming agent is in the form of a dry powder. This provides ease of handling and improved storability. Liquid foaming agents would solidify in freezing climates, which would require freeze protection or would require the foaming agent to be thawed prior to use.

Alkanolamide foaming agents according to the present invention include, but are not limited to, those having from about 12 to about 20 carbon atoms Alkanolamine foaming agents according to the present invention include, but are not limited to, those having from about 12 to about 20 carbon atoms.

Alkylaryl sulfonate foaming agents according to the present invention include, but are not limited to, those having one aryl group and having alkyl groups with about 12 to about 20 carbon atoms.

Polyethylene oxide-polypropylene oxide block copolymer foaming agents according to the present invention include, but are not limited to, those having about 10 to about 20 units of each block.

Alkylphenol ethoxylate foaming agents according to the present invention include, but are not limited to, those having an alkyl group of about 12 to about 20 carbon atoms.

Carboxylates of fatty acid foaming agents according to the present invention include, but are not limited to, those in which the fatty acid moiety has about 12 to about 20 carbon atoms.

Ethoxylates of fatty acid foaming agents according to the present invention include, but are not limited to, those in which the number of ethoxylate groups is about 10 to about 20 and the fatty acid moiety has about 12 to 20 carbon atoms.

Sulfonates of fatty acid foaming agents according to the present invention include, but are not limited to, those in which the fatty acid moiety has about 12 to about 20 carbon atoms.

Sulfates of fatty acid foaming agents according to the present invention include, but are not limited to, those in which the fatty acid moiety has about 12 to about 20 carbon atoms.

Fluorocarbon containing surfactant foaming agents according to the present invention include, but are not limited to, those having about 12 to about 20 carbon atoms and one or more $CH_2$ moieties are replaced by $CF_2$ moieties.

Olefin sulfonate foaming agents according to the present invention include, but are not limited to, those having about 12 to about 20 carbon atoms.

Olefin sulfate foaming agents according to the present invention include, but are not limited to, those having about 12 to about 20 carbon atoms.

Hydrolyzed protein foaming agents according to the present invention include, but are not limited to, the derived products of hydrolysis of proteins. The relative molecular weight of the protein can be any molecular weight that provides for foaming action in a cementitious mixture. Preferably, the relative molecular weight ranges from about 10,000 to about 50,000. Preferred hydrolyzed proteins are hydrolyzed gelatin, hydrolyzed collagen, and hydrolyzed proteins derived from blood. A non-limiting example of hydrolyzed gelatin is TG222 from Milligan & Higgins (Johnstown, N.Y.).

Additionally, a foam stabilizing agent can be added to the mixture to stabilize the foam to provide a longer foam life. Foam stabilizing agents that can be used with the present invention include pre-gelatinized starches, cellulose ethers, polyethylene oxides, very fine clays, natural gums, polyacrylamides, carboxyvinyl polymers, polyvinyl alcohols, a nonpolar hydrophilic material, synthetic polyelectrolytes, silica fume, and mixtures thereof. A foam stabilizer may be needed because the transport time in the pipeline could be long and/or the operating pressure in the pipeline may be high, thus compromising the stability of the foam.

Cellulose ether foam stabilizing agents according to the present invention include, but are not limited to, modified cellulose ether.

Polyethylene oxide foam stabilizing agents according to the present invention include, but are not limited to, POLYOX supplied by Union Carbide. It is preferred that the polyethylene oxides have a weight average molecular weight greater than about 500,000.

Very fine clay foam stabilizing agents according to the present invention include, but are not limited to, bentonite clay. The definition of very fine clays is meant to include those clays with a particle size less than about 20 microns.

Natural gum foam stabilizing agents according to the present invention include, but are not limited to, guar gum, welan gum, and mixtures thereof.

Polyvinyl alcohol foam stabilizing agents according to the present invention include, but are not limited to, those with a weight average molecular weight greater than about 1,000.

Synthetic polyelectrolyte foam stabilizing agents according to the present invention include, but are not limited to, polyvinyl sulfonates with a weight average molecular weight greater than about 1,000, polyvinyl polymers with a weight average molecular weight greater than about 1,000, and mixtures thereof.

The foam stabilizing agent can be added, either alone or in combination with other foam stabilizing agents, in an amount from about 0.0001% to about 2% based on the mass of the slurry.

Additionally, a water reducing dispersant can be added to the mixture to disperse the materials and thus allow for a lower water content in the mixture while still maintaining a flowable consistency thus improving the properties of the placed fill material. Water reducing dispersants that can be used with the present invention include, but are not limited to lignosulfonate salts, beta naphthalene sulfonate salts, melamine containing water reducers, polycarboxylic salts, polycarboxylate copolymers, polycarboxyl amines, polycarboxyl imides, and mixtures thereof. The water reducing dispersant is added in an amount greater than 0% to about 2% based on the mass of the binder or cementitious system. It should be noted that the dispersant dose rate may also be influenced by the particle size distribution and mineralogy of the solids material being treated, and the chemistry of the admixture.

The binder can be added before the mixing step in the method of the present invention, or the binder can be added after the transportation step.

As used herein, the term binder includes those materials that will cause a mixture to set. These include, but are not limited to cements, such as portland or high alumina cements, slags, fly ash, cementitious materials, lime, pozzolans, and mixtures thereof.

Further, any other additives that do not interfere with the properties of the particulate slurry transported by the present invention may be added. These additives may include, but are not limited to, cement, set retarders, set accelerators, lime, fly ash, ground granulated blast furnace slag, and corrosion inhibitors. The amount of binder that can be added is determined by the amount of setting time and compressive strength desired. Typically, the binder or cementitious material is added in an amount greater than 0% to about 30% based on the mass of the solid material.

An advantage of incorporating a foaming agent into the particulate solids mixture is a reduction in the bleed. Bleeding is the separation of water from the mixture. It is desired that the water not bleed from the mixture, because that will cause a reduction in the flowability of the mixture. The incorporation of foaming agent can reduce the bleeding by as much as 100% based on laboratory trials.

When the material has been transported to its placement area, the air in the foam may be removed by a variety of methods, if required. These methods include, but are not limited to, mechanical impact as when dropped into a stope underground or when mechanically worked by conventional earth-compacting equipment such as rollers or sheeps-foot rollers. In addition, a chemical additive, such as a defoamer, may be subsequently added to the transported slurry, which will cause the foam to collapse, thus removing most of the air voids from the foamed material.

In another embodiment of the present invention, a method is provided to excavate solid particulates, transform the solid particulates into a paste like consistency, and then transport the solid particulates to a placement area. First the solid particulates are removed from the excavation area by a pump and the foaming agent is mixed in. Some water may be necessary to break up the solid particulates to allow initial pumping; however, the amount of water needed does not generally exceed an amount that would lower the total solids below paste consistency.

The foaming agent can be added to the solid particulates in a mixer separate from the pump, or a mixing pump can be used. An example of a mixing pump is the Toyo DP/DL wet end pump. This type of pump is a submersible, bottom suction pump with an agitator and water supply at the bottom. In this pump, water is fed to the agitator to break up thick materials or sludge and convert it to a paste to allow initial pumping. The pump is fitted with a nozzle to inject the foaming agent, or any other desired admixture, in the agitator portion of the mixer pump. The foaming agent is injected by use of a carrier, which can be water, compressed air, or any other gas. If the foaming agent is a dry powder, it can be dissolved in a water stream, or it can be blown in with the gas. Alternatively, a pre-generated foam can be used in place of the in-situ foaming agent embodiment. The foam provides the pumpability of the transportable mine tailing mixture slurry.

The pump is moved about the excavation area to remove the solid particulates. Any suitable method of moving the pump is satisfactory. The pump may be suspended from a barge or a crane. Also, the pump could be suspended from a two dimensional cable pulley system that covers the excavation area. The cable pulley system would include parallel opposed pulleys with a pulley mounted transverse between the parallel pulleys. The pump could move side to side on the transverse pulley, and it could move end to end on the parallel pulleys.

From the excavation area, the foamed solid particulates are transported to a backfill plant. At the backfill plant, binder is added to the foamed solid particulates. The water content of the incoming foamed solid particulates is measured with a moisture analyzer. If necessary to achieve the desired total solids level in the final solid particulates binder mixture, water can be added to the mixture. The amount of water is calculated based on the total solids of the incoming foamed solid particulates.

Traditionally, a pug mixer with two counter-rotating mixer screws, variable speed drive, and adjustable pitch blades is used to mix binder and optional water into the solid particulates to form a hydraulic solid particulate composition. After being mixed, the hydraulic solid particulate composition is transported to the placement area by gravity feed or by pumping.

In the above embodiment, the excavation area can be a mine tailings pond, the solid particulates can be mine tailings, and the placement area can be a mine or a stope.

When referring to a mine throughout this specification, it is also meant to include a stope.

EXAMPLES

The invention can be described by the following non-limiting examples. In the examples set forth below, slump was measured by ASTM C143 and C143M.

Also, cwt refers to hundred weight. Density was measured by placing the mixture into a 400 ml cup. The tare weight of the cup was 749 g.

Mix A 40 kg wet mine tailings
1.2 kg cement-Portland Cement from Lafarge
4 kg water
Total weight of mixture and cup 1738.5 g.
Density=989.5 g/400 ml
The water content was varied to determine the slump.
Total water at 5.4 kg: slump: large cone 4.5 in.
Total water at 6 kg: slump: large cone 7 in.

Mix B 40 kg mine tailings
1.2 kg cement-Portland Cement from Lafarge
3.9 kg water
8.96 ml of a polyoxyalkylene derivatized methacrylate polymer*
5.0 ml of a polyoxyalkylene derivatized methacrylate polymer*
Total weight of mixture and cup 1741.8 g.
Density=992.8 g/400 ml

*—Polymer was FC-900 from Master Builders, Inc., Cleveland, Ohio

Next, a pre-generated foam was added to the mixture.
Slump of the mixture with foam large cone 5.5 in. small cone 1.75 in.
Total weight of mixture and cup 1510.3 g.
Density=761.3 g/400 ml Next, mixtures were prepared and tested as a plain reference and then with foaming agents added. The slump and density of the mixtures were tested, then test cylinders were prepared to test bleeding and compressive strength. There were 4 3"×6" cylinders prepared with 1 cylinder to measure bleedwater, and 3 for compressive strength determination.

Set 1

45 kg mine tailings @10.9% moisture
1.335 kg cement-Portland Cement from Lafarge
6.6 kg water was added to bring the pulp density to 72% solids.

1A
Slump large cone 7.5 in.
Total weight of mixture and cup 1571.9 g.
Density=822.1 g/400 ml
Note: The material was segregating and bleeding rapidly.

1B
To the Set 1A mixture, 9 ml of a 15% solution of a modified cellulose ether was added.
Slump large cone 7.5 in.
Total weight of mixture and cup 1549.1 g.
Density=800.1 g/400 ml
Note: The material was segregating and bleeding.

1C
To the Set 1B mixture, 10 g PS-356 was added as a foaming agent.
Slump large cone 7 in.
Total weight of mixture and cup 1469.6 g.
Density=720.6 g/400 ml
Note: The mixture was stable and did not segregate.

Set 2

The mixture was prepared the same as Set 1, but with 5.4 kg additional water to produce a pulp density of 74%.

2A
To the Set 2 mixture, a modified cellulose ether @8.87% or 3 oz./cwt of cement; and
a water reducing foam stabilizer @8.87% or 3 oz./cwt of cement; and
10 g PS-356 were added.
Slump large cone 3 in.
Total weight of mixture and cup 1427.5 g
Density=678.5 g/400 ml.

2B
To Mixture 2A, 1.2 kg of water was added to yield a pulp density of 72%.
Slump large cone 6.25 in.
Total weight of mixture and cup 1421.2 g.
Density=672.2 g/400 ml
Note: Slight bleeding was observed The results of compressive strength and bleed testing for the above examples are listed below in Table 1.

TABLE 1

| Sample | Bleed Test (ml of water) (cumulative) | | Compressive Strength (psi) | |
|---|---|---|---|---|
| | @ 4–5 hours | 3 days | 3 day | 28 day |
| 1A | 22.5 | 50.5 | 37 | 340 |
| 1B | 15 | 38 | 33 | 370 |
| 1C | 3 | 12 | — | 240 |
| 2A | 0 | 0 | 22 | 280 |
| 2B | 3 | 3 | 17 | 250 |

Mix 1A shows the typical characteristics of an untreated slurry. Table 1 shows a high amount of bleeding in that Mix 1C a nearly 90% and 80% reduction in bleeding with the addition of the foaming agent and foam stabilizer at 4 to 5 hours and 3 days, respectfully. Mix 2A shows a combination of water reducer, several foam stabilizers, and foaming agent that produced a mix that did not bleed. Also, Table 1 shows that all of the mixtures achieved an acceptable compressive strengths.

EXAMPLE 2

Three tests of mine tailings were made with PS-356 foaming agent supplied by Master Builders, Inc., Cleveland, Ohio.

The moisture of the mine tailings was approximately 14% by mass of the solids with a consistency of a loose, moist sand which has a "packing" consistency and would not flow as a liquid.

In Test #1, 1000 grams of the mine tailings were mixed with 0.25 g of PS-356 in a Hobart mixer. After approximately one minute of mixing, the material produced a mud-like quality that allowed the material to flow and could be pumped. With continued mixing, the density of the mix was reduced with further mixing as shown in Table 2 below.

In test #2, 1000 grams of the mine tailings were mixed with 0.1 g of PS-356 in the Hobart mixer. After approximately one minute of mixing, the material produced a mud-like consistency that flowed and was pumpable. With continued mixing, the density of the mix was reduced as shown in Table 2 below.

In test #3, 1000 grams of the mine tailings were mixed with 0.05 g of PS-356 in the Hobart mixer. After approximately one minute of mixing, the material produced a mud-like consistency that flowed and was pumpable. With continued mixing, the density of the mix was reduced as shown in Table 2 below.

TABLE 2

| Mix | PS-356 0.25 g dose | | PS-356 0.1 g dose | | PS-356 0.05 g dose | |
|---|---|---|---|---|---|---|
| Time (min) | Mass/ 400 ml | Mass/ ml | Mass/ 400 ml | Mass/ ml | Mass/ 400 ml | Mass/ ml |
| 0 | 856 | 2.14 | 856 | 2.14 | 856 | 2.14 |
| 1 | 427.6 | 1.818 | 560.5 | 1.4 | 637.1 | 1.59 |
| 2 | 407.8 | 1.019 | 508.4 | 1.27 | 645.9 | 1.61 |
| 3 | 358.7 | 0.896 | 502.6 | 1.25 | 665.4 | 1.66 |
| 4 | 323.1 | 0.807 | 503.8 | 1.26 | not tested | not tested |

The tests results in Table 2 show that the addition of the foaming admixture can convert a tailing material with little free moisture into a material that has fluid properties when converted to a foamed mixture. The resulting material has lower density and better flow characteristics than the original moist tailings starting material.

It should be appreciated that the present invention is not limited to the specific embodiments described above, but includes variations, modifications and equivalent embodiments defined by the following claims.

What is claimed is:

1. A method of transporting particulates comprising, providing particulates wherein water is optionally provided with the particulates;

adding water to the particulates, if necessary, in an amount sufficient to form at least a paste consistency;

adding a non-foamed foaming agent to form a mixture;

adding a foam stabilizing agent to said mixture, wherein the foam stabilizing agent is selected from the group consisting of pre-gelatinized starches, polyethylene oxides, very fine clays, natural gums, polyvinyl alcohols, synthetic polyelectrolytes, silica fume, and mixtures thereof;

mixing said mixture to form a foam within the mixture; and, transporting the mixture, wherein said transporting is at least one of pumping, gravitational head driven pressure, or gravity feed;

wherein said foaming agent is selected from the group consisting of alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof; and, further wherein if said polyethylene oxide-polypropylene oxide block copolymers are present, said block copolymers have about 10 to about 20 units of each block.

2. The method of claim 1, wherein the mixture has a water content of less than about 50% based on the mass of the particulates, and in an amount sufficient to form at least a paste consistency in the mixture.

3. The method of claim 1, wherein the foaming agent is added in an amount from about 0.001% to 0.4% based on the mass of the particulates.

4. The method of claim 1, wherein said particulates are selected from the group consisting of mine tailings, ores, sand, coal, soils, clays, silts, aggregates, and mixtures thereof.

5. The method of claim 1, wherein the foam stabilizing agent is added in an amount from about 0.0001% to about 2% based on the mass of the mixture.

6. The method of claim 1 further comprising adding a water reducing dispersant to the mixture and mixing the mixture.

7. The method of claim 6, wherein the water reducing dispersant is selected from the group consisting of lignosulfonate salts, beta naphthalene sulfonate salts, melamine containing water reducers, polycarboxylic salts, polycarboxylate copolymers, polycarboxyl amines, polycarboxyl imides, and mixtures thereof.

8. The method of claim 6, wherein the water reducing dispersant is added in an amount from greater than 0% to about 2% based on the mass of the particulates.

9. The method of claim 1 further comprising adding a binder to the mixture.

10. The method of claim 9, wherein the binder is added in an amount from greater than 0% to about 30% based on the mass of particulates.

11. The method of claim 9, wherein the binder is added at least one of prior to the mixing step and after the transportation step.

12. The method of claim 9, wherein the binder is selected from the group consisting of portland cement, ground granulated blast furnace slag, fly ash, lime, high alumina cement, and mixtures thereof.

13. The method of claim 1, wherein the particulates are mine tailings.

14. The method of claim 13 further comprising transporting the mixture into a mine as backfill.

15. The method of claim 13, wherein the mixture further comprises a binder.

16. The method of claim 13 further comprising transporting the mixture from a mine to an area outside of the mine.

17. The method of claim 9 further comprising adding an additive selected from the group consisting of set retarders, set accelerators, corrosion inhibitors, and mixtures thereof.

* * * * *